Jan. 9, 1962  R. J. SIMPSON  3,016,481
CAPACITOR
Filed July 30, 1959

INVENTOR.
RAYMOND J. SIMPSON
BY
Wolfe Hubbard Voit + Osann
ATTYS.

3,016,481
CAPACITOR

Raymond J. Simpson, River Forest, Ill., assignor, by mesne assignments, to Dearborn Electronic Laboratories of Delaware, Inc., Orlando, Fla., a corporation of Delaware
Filed July 30, 1959, Ser. No. 830,661
1 Claim. (Cl. 317—258)

The present invention relates to capacitors and more particularly to capacitors of the wound foil type.

It is an object of the invention to provide a capacitor of the wound foil type having a higher degree of reliability than conventional capacitors. It is a related object to provide a capacitor which, in the same nominal voltage rating, is considerably smaller than capacitors of conventional design. It is another object of the invention to provide a capacitor which exhibits a greater degree of reliability when subjected to voltages in excess of the nominal rating.

It is a further object of the invention to provide a capacitor which is less apt to break down because of corona effects than conventional capacitors and which therefore requires less care in manufacture to avoid conditions which tend to promote corona discharge within the device.

It is still another object to provide a capacitor which, while it employs layers of paper as insulation, is not subject to the statistical failure which is experienced in paper insulated capacitors as they are conventionally manufactured. It is a related object to provide a capacitor using layers of paper which achieves a higher degree of reliability without requiring exercise of extreme care in the manufacture and selection of the paper.

It is a more specific object to provide a capacitor of the wound foil type which includes layers of paper and plastic film between the electrodes and in which the layers are so arranged to cooperate with one another in a novel fashion to produce an improved result. Finally it is an object to produce a capacitor which may be made at a cost which is less than that of conventional capacitors of similar rating.

Other objects and advantages of the invention will become apparent upon reading the attached detailed description and upon reference to the drawing in which.

While the invention has been described in connection with a preferred embodiment, it will be understood that I do not intend to be limited to the particular embodiment illustrated but intend to cover all alternative and equivalent constructions falling within the spirit and scope of the appended claims.

Figures 1, 5:
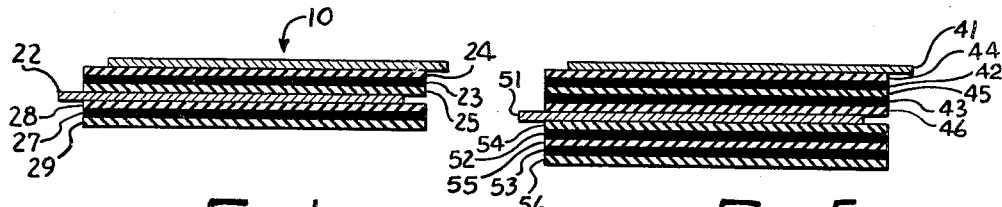
FIGURE 1 shows the layers of foil and insulation in a capacitor constructed in accordance with the present invention and taken along the line 1—1 in FIG. 2.
FIG. 5 is a cross sectional view similar to FIG. 1 but showing a modified construction including additional layers of insulation.
Figure 2:
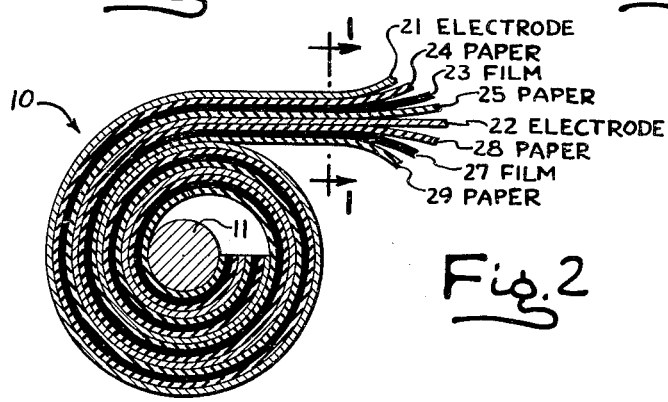
FIG. 2 shows, in enlarged form to bring out the details of construction, the winding of a capacitor constructed in accordance with the invention.

Referring now to FIGS. 1 and 2 there is shown a capacitor 10 of the wound foil type, with FIG. 2 showing the winding of the first few convolutions of electrode and insulating material. In conventional practice, capacitors of this type are manufactured on a winding machine in which the superimposed layers of foil and insulating material fed from supply rolls in the form of long ribbons are wound on a mandrel 11 which is subsequently removed. The electrodes are offset so that they project from the respective ends of the finish product for attachment of wire terminal leads or the like with a predetermined area of overlap. The capacitance is controlled by controlling the total area of overlap and the thickness and dielectric constant of the layer of insulation between the electrodes.

Figure 3:
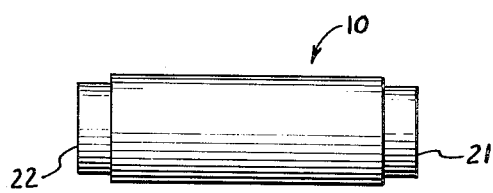
FIG. 3 shows the capacitor of FIG. 2 wound and with the convoluted electrodes projecting at the ends thereof.
Figure 4:
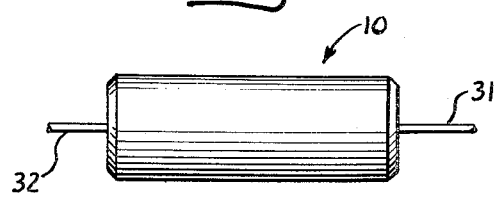
FIG. 4 shows the capacitor of FIG. 3 with the terminal electrodes in place and with the foil compactly coined thereover.

In accordance with the present invention, I provide a capacitor having sheets of metal foil with a composite layer of insulation between the electrodes, made up of a plurality of plies including a ply of plastic film and plies of porous, oil-impregnated paper lying on opposite sides of the plastic film. Thus, in FIGS. 1 and 2 it will be noted that the assembled layers include a first or outer electrode 21, a second or inner electrode 22, and intervening insulation consisting of a film 23 and plies of paper 24, 25. On the opposite side of the electrode 22 a further composite layer of insulation is provided including a plastic film 27 sandwiched between plies of paper 28, 29. The plies of insulating material are preferably coextensive as shown and extend beyond the area of overlap of the foil electrodes. Preferably, however, the foil electrodes are offset in opposite directions to facilitate the making of electrical connections. Thus following winding to the desired capacitance, the convoluted ends of the electrodes project outwardly from the capacitor body as shown in FIG. 3.

The capacitor at this stage is impregnated with oil or the like in accordance with well known impregnating techniques. It will suffice to say that a plurality of capacitors are placed in a vacuum tank and a vacuum is drawn and sustained sufficiently long as to draw the air out of the pores of the insulating paper. Insulating oil, or other insulating liquid is then admitted, preferably of high temperature, to submerge the capacitors and the vacuum is released so that the liquid is forced into the pores of the paper. This serves not only to mprove the insulating qualities of the paper but also to "wet" the surfaces of the electrodes and the surfaces of the plastic film. Thus oil surrounds the edges of the electrodes and covers any minor imperfections, such as pinholes, which may exist in the plastic film. If desired, more rapid penetration of the insulating liquid may be achieved by employing positive pressure to force the oil into the pores of the paper.

Following impregnation, wire terminal electrodes 31, 32 are added. To insure good electrical contact and to provide a hermetic seal, the extended electrodes 21, 22 may be compacted or "coined" in accordance with the teachings of Foster et al. patent application Serial No. 749,236, filed July 17, 1958, and now Patent No. 2,969,488.

The paper employed in the above procedure may be conventional craft capacitor paper, which is porous by nature, and which may range from a few mils to a fraction of a mil in thickness. The plastic film may be made of any one of a number of different plastic materials having the qualities of high dielectric constant, good tensile strength, physical and chemical stability over long periods of time, and reasonable cost. I prefer to employ film formed of a polyester resin commercially available under the name "Mylar" but, with the above considerations in mind, it will be apparent that one skilled in the art may secure good results with other plastic films, even common cellulose acetate film.

It is found that when a cacapitor is constructed in accordance with the above teachings higher statistical reliability is achieved than is possible than when paper alone is employed as an insulating material. Also, it is found that the resulting product is more reliable than capacitors employing plastic film alone as insulation. The total amount of insulation required for a given voltage rating is substantially reduced.

Studies have been made to ascertain the reasons for the improved reliability. Observations indicate that all capacitor paper commercially available includes conductive or semi-conductive particles. When a plurality of layers of paper are employed, such particles are generally out of register so that breakdown from one electrode to the other does not occur. However, in a portion of conventional capacitors, and to an extent which can be statistically determined knowing the qualities of the paper, conductive particles are either in alinement or so nearly in alinement that breakdown is induced. This may occur either in the factory when the capacitor is tested and prior to shipment or it may occur later in the field, for example, when the capacitor is subjected to a voltage surge or after the capacitor has operated for a period of time in a humid environment. Where the capacitor is employed in a radio or TV receiving set, the offending unit may usually be located and replaced without great expense or inconvenience. However, certain applications require a considerably higher degree of reliability, as, for example, in computers, in military apparatus, or in guided or ballistic missiles. The users of capacitors for such critical applications are willing to pay a high premium for absolute reliability. However, reliability near absolute has not been achieved using conventional manufacturing techniques. Tests show that such reliability can be achieved when employing the present invention.

It is also found that the present capacitor provides a substantially higher degree of reliability than capacitors insulated with plastic films alone. Studies show that the reason for this is that the plastic film, when employed in contact with the electrode, tends to encourage the formation of a corona type discharge. Such discharge is particularly apt to occur from minute discontinuities either along the edges or on the surface of the electrodes when the capacitor is operated at high voltage. Corona formation is encouraged by the presence of voids or air pockets. Such voids or air pockets are obviated in the present construction since the porous paper appears to act as a wick in contact with all of the slick and non-porous surface of the foil and plastic plies, drawing in the fluid to "wet" the entire surface from which corona discharge might occur. Thus the main disadvantage of using plastic film is taken care of. Corona discharge has been particularly troublesome in conventional units since corona does not usually result in immediate breakdown; on the contrary, breakdown will occur unpredictably after the capacitor has been in operation for a number of hours or, in some instances, a number of years. To guard against breakdown due to corona effects, elaborate precautions have been taken in the past manufacture of conventional high voltage capacitors including the use of relatively heavy gauge foil, free of nicks or other flaws, but in spite of the expense incurred, perfect reliability has been an unattainable goal.

Because of the improved reliability resulting from use of the present teachings, the capacitors may be conservatively rated for voltages which are much higher than would be normally expected. In actual manufacturing practice, because of the reduction in total insulation, it has been possible to produce capacitors of a given voltage rating in sizes as small as 20 to 25% of the volumetric size of conventional capacitors. Consequently, capacitors manufactured in accordance with the above are particularly well suited for use wherever weight and space are at a premium, as for example in guided missiles and light weight military apparatus. Moreover, it is found that even in these small sizes the capacitors manufactured in accordance with the invention are more resistant than conventional capacitors to voltage surges above the nominal rating.

While I prefer to employ insulating comprising a ply of plastic film surrounded by two plies of paper, the invention is not limited thereto but includes arrangements in which the total number of plies is increased as, for example, in FIG. 5. In this version, the electrode indicated at 41 has adjacent insulation consisting of layers of plastic film 42, 43 with alternate plies of paper 44, 45, 46. Similarly the electrode 51 has adjacent plies of plastic 52, 53 with alternate plies of paper 54, 55, 56.

In the preferred embodiment of the invention, the thickness of each ply of paper is substantially equal to the thickness of the plastic film. Thus, in the embodiment shown in FIG. 1, two-thirds of the insulation thickness is in the form of paper and one-third in the form of film whereas in the version shown in FIG. 5, 60% of the insulation, by thickness, is in the form of paper and 40% in the form of film.

Since the total amount of material is reduced in manufacturing a capacitor of given capacitance value, it will be apparent that the cost of the present capacitor, per microfarad, may be substantially reduced. Also it is possible to produce a capacitor having improved reliability without employing unusual care in manufacture and selection of the paper or in the slitting of the foil. When a capacitor of the present construction is tested and successfully withstands the test voltage, such capacitor may be employed indefinitely with assurance that breakdown will not occur at or below the test voltage.

I claim as my invention:

In a capacitor of the wound electrode type, the combination comprising a pair of electrodes in the form of extended ribbons of metal foil wound together in overlapping relation and having a predetermined area of overlap, a composite insulating layer interposed between said electrodes and extending beyond the area of overlap of the electrodes for insulating the same, said insulating layer comprising a first ply of porous paper adjacent one of said electrodes and a second ply of porous paper adjacent the other of said electrodes and a ply of plastic film arranged coextensively between said plies of paper for the purpose of providing an insulating barrier between any conductive or semi-conductive particles which may exist in the two plies of paper and which may be in register with one another, the pores of said paper being impregnated with oil or the like dielectric liquid so that the surfaces of the electrodes and plastic film are wetted with the oil thereby to inhibit the setting up of a corona type discharge when the capacitor is operated at high voltage.

References Cited in the file of this patent

UNITED STATES PATENTS

| 1,898,789 | Ringwald | Feb. 21, 1933 |
| 2,096,673 | Katzman | Oct. 19, 1937 |

FOREIGN PATENTS

| 562,667 | Great Britain | July 11, 1944 |
| 593,749 | Great Britain | Oct. 24, 1947 |